United States Patent [19]

Gernandt

[11] 3,724,026

[45] Apr. 3, 1973

[54] PRODUCING MOLDED MEAT STICKS
[75] Inventor: Louis E. Gernandt, Eau Claire, Wis.
[73] Assignee: Armour and Company, Chicago, Ill.
[22] Filed: Oct. 30, 1970
[21] Appl. No.: 85,408

[52] U.S. Cl............................................17/1, 17/32
[51] Int. Cl.................................................A22c 7/00
[58] Field of Search.....................17/1, 32; 107/8 B

[56] References Cited

UNITED STATES PATENTS 1,692,559 11/1928 Miller...................................107/8 B
3,213,486 10/1965 Blake........................................17/1 R
3,550,188 12/1970 Howard, Jr. et al.....................17/1 R Primary Examiner—Lucie H. Laudenslager
Attorney—Carl C. Batz

[57] ABSTRACT

A mold plate is provided with mold recesses open at the bottom and top adapted to receive coherent meat bodies and the like, with a communicating open-bottomed slot at the end of each recess having a spring-urged closure, and sticks are pressed through the slots to open the closures and enter the meat bodies, the meat bodies with attached sticks being then discharged from the plate bottom.

7 Claims, 9 Drawing Figures

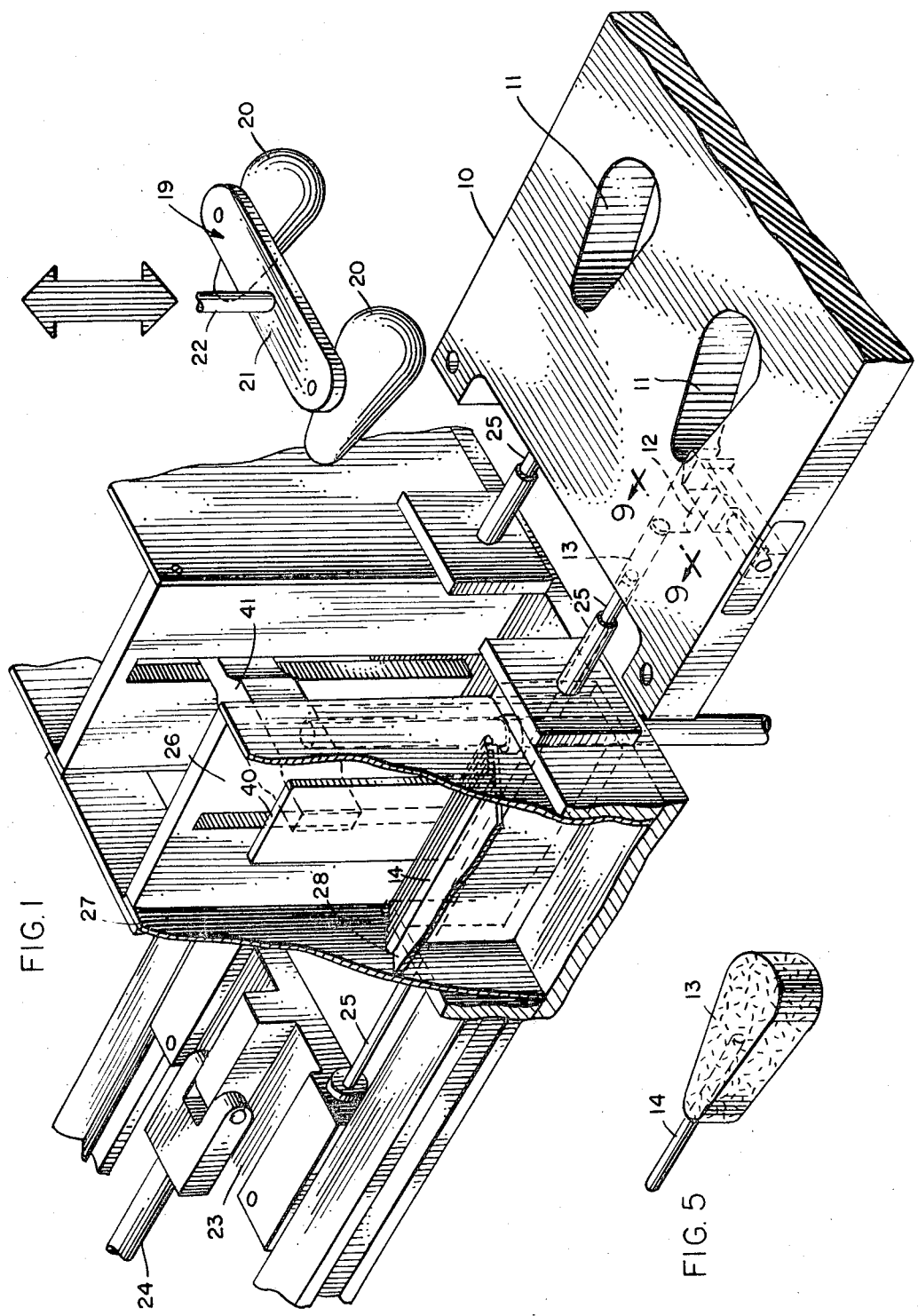

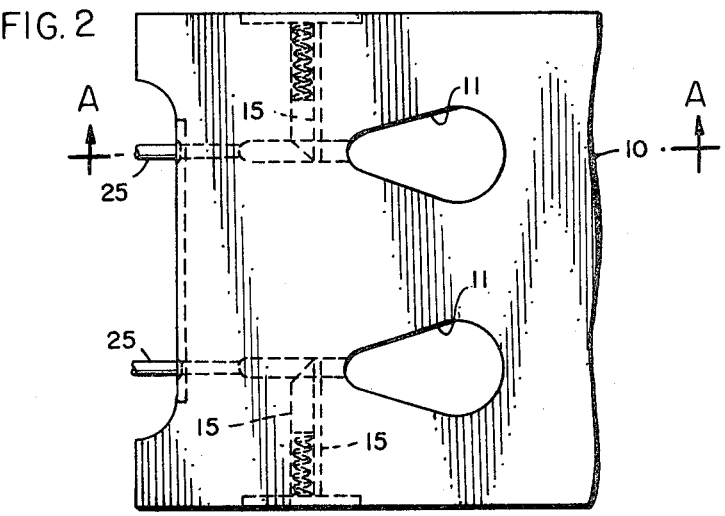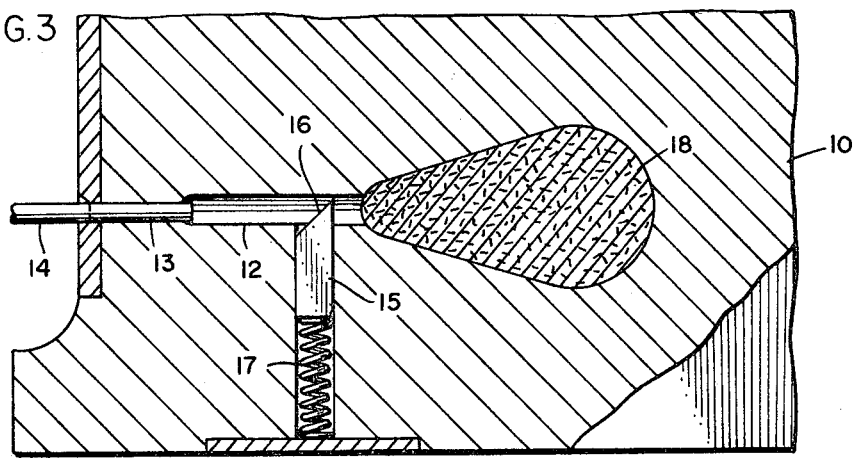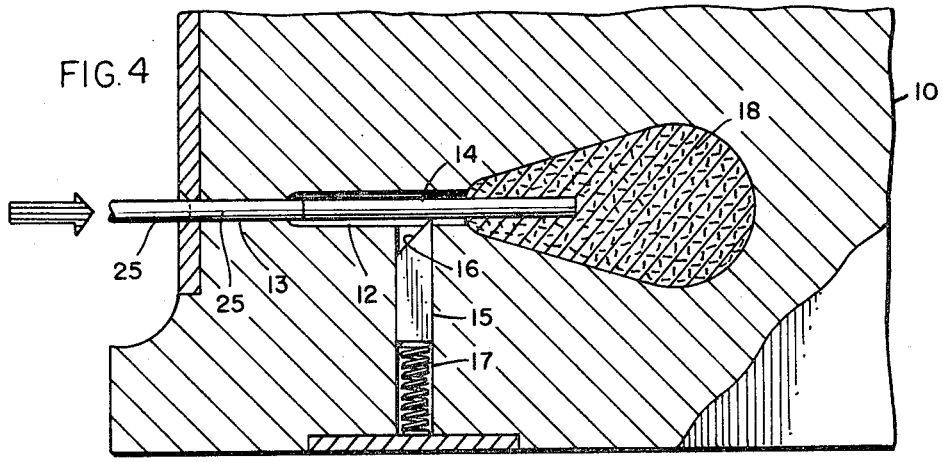

PATENTED APR 3 1973 3,724,026

INVENTOR:
LOUIS E. GERNANDT
BY Carl C. Batz
ATT'Y

PRODUCING MOLDED MEAT STICKS

BACKGROUND AND SUMMARY

Meat bodies provided with stick handles have been heretofore provided forming a product often called "mock chicken legs," but the procedure required in molding the meat bodies with the sticks pressed therein has been slow and time consuming, and unsatisfactory from the standpoint of cost.

I have discovered a procedure wherein a mold plate may be provided with a number of mold recesses open at the bottom and top so that the molds can be rapidly filled with a coherent meat body while providing each mold recess with a slot extension open at its bottom and provided preferably with an automatic closure, means being provided for projecting sticks through the slots to open the closure and penetrate the meat bodies so that the meat bodies can then be ejected from the bottom of the plate with the sticks affixed thereto. In such an operation, the mold plate may be shuttled back and forth between a loading position and a punch-out position with automatic mechanism provided for punching out the patty or meat body with the stick affixed thereto.

DRAWINGS

In the accompanying drawings,

FIG. 1 is a broken perspective view of apparatus embodying my invention relating to apparatus and method;

FIG. 2, a broken top plan view of the mold plate which may be employed;

FIG. 3, an enlarged broken top plan view of a portion of the mold plate provided with spring closure means in closed position;

FIG. 4, a view similar to FIG. 3 but showing the closure pressed aside and the stick being introduced into the meat body;

FIG. 5, a perspective view of the finished product;

FIG. 6, a broken plan view of the meat filling means and stick feeding mechanism;

FIG. 7, a broken side view in elevation of structure shown in FIG. 6;

FIG. 8, a rear view in elevation of the structure shown in FIG. 6; and FIG. 9, a detail sectional view, the section being taken as indicated by line 9—9 in FIG. 1.

DETAILED DESCRIPTION

Figure 9:
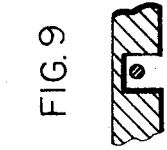

In the illustration given, the numeral 10 designates a mold plate equipped with mold recesses 11. At one end of the mold recess 11 there is formed a slot 12 which is open at the bottom and which communicates on its outer side with a stick passage or hole 13 through which the stick 14 may be extended.

To seal off the slot 12 during the filling operation, I provide a plunger 15 provided at its outer end with a cam or bevel edge 16, the plunger being urged by a spring 17 to closed position, as shown in FIG. 3. When a stick 14 is pressed through the passage 13 and the slot 12, it engages the cam face 16 and presses the closure plunger 15 rearwardly, as shown best in FIG. 4, and the stick 14 is pressed further into the meat body 18.

The body 18 may be any soft plastic coherent food material such as comminuted meat of the type used in making hamburgers, meat patties, and the like. Such a stick of coherent material can be pressed into the mold recesses 11 and will remain in position during the affixing of the sticks 14. The meat can be introduced into the recesses 11 by hand or by any other suitable means. I prefer to have the plate 10 shuttle back and forth from the punch-out position shown in FIG. 1 to a load position beneath the hopper A, as indicated in dotted lines in FIG. 6, hopper A being preferably equipped with mechanism for forcing meat into the mold recesses 11 and for cutting away the excess meat from the top and bottom sides as the plate is drawn from the hopper enclosure A outwardly to the position shown best in FIGS. 3 and 4. Such hopper-filling mechanism is shown in detail in U. S. Pat. No. 3,293,688 and also in U.S. Pat. No. 3,417,425.

As shown best in FIG. 1, punch-out mechanism 19 may be provided in which depending shoes 20 are adapted to be moved downwardly through the recesses 11 for ejecting the meat bodies with the sticks affixed thereto. The shoes 20 are supported upon a frame 21 provided with a hoist rod 22 which may be raised and lowered manually but preferably by automatic power mechanism for ejecting the meat bodies 18.

I provide means for feeding the sticks 14 forwardly through the passage 18, slot 12, and into the recesses 11. In the illustration given in FIG. 1, I provide a ram 23 driven by a rod 24 and mechanism which will be later described for effecting back and forth operation of the ram 23. Secured to the forward end of the ram 23 are the push rods 25 which extend forwardly through a magazine 26 and into the guide passages 13 for pressing the sticks into the meat bodies. It is an advantage that the drive means for the patty-forming mechanism is thus utilized also for driving the stick-feeding mechanism.

The magazine 26 is provided with a frame member 27 supporting inclined stick supports 28 on which the sticks are supported, and during the operation when the push rod 25 is retracted, a stick 14 is automatically fed into the channel in front of the push rod 25.

Figure 8:
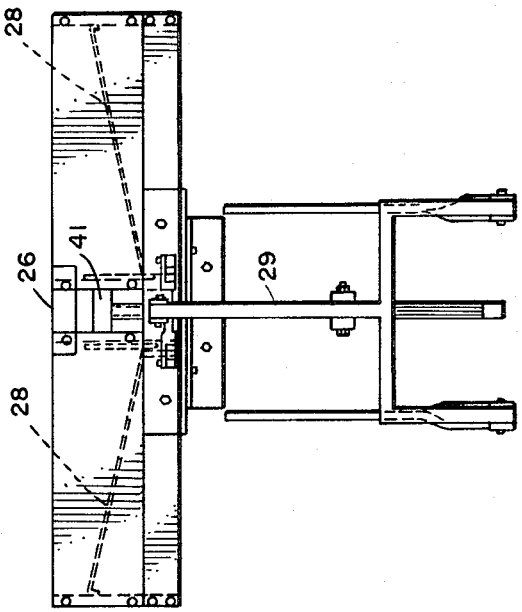
Figure 6:
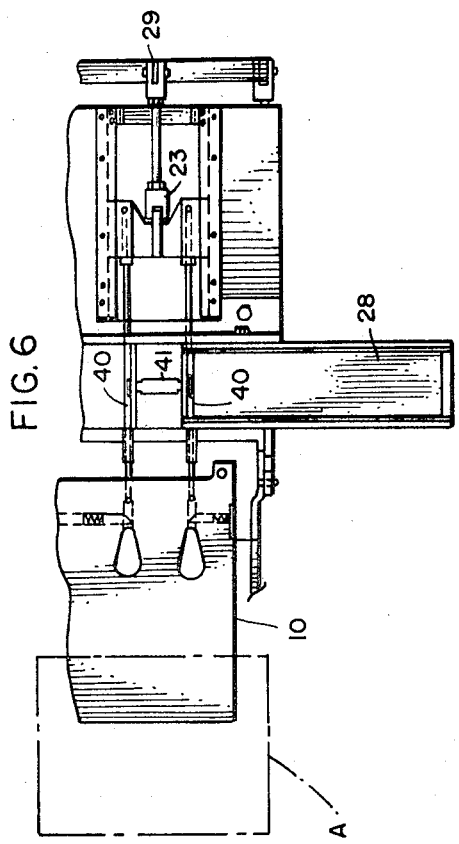
Figure 7:
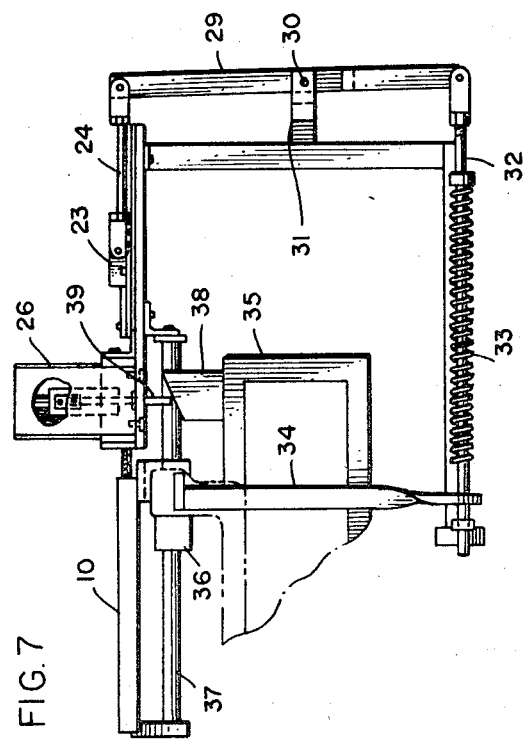

The operating mechanism is shown best in FIGS. 6, 7 and 8. The ram 23 is actuated by a rod 24 connected to the crank 29 pivotally supported at 30 upon the frame member 31. The lower end of the lever 29 is connected to a drive rod 32, preferably provided with a spring 33, and a drive arm 34 is carried by a shuttle bar 35 which is driven by a cam (not shown) for forward and rearward movement. The upper end of the drive member 34 is connected to a sleeve 36 carried by a track member 37. A cam 38 is provided for raising the stick feed rod 39 so as to elevate the gates 40 for releasing a stick in front of each push rod 25. The feed rod 39 engages a cross bar 41 connected to the gates 40 and thus the gates are caused to rise and fall during each operation of the push rods 25.

The shuttle mechanism 35 also is connected (by means not shown) to the plate 10 for moving it to and from the hopper A.

While I have shown the mold plate 10 provided with two mold recesses 11, it will be understood that many recesses may be formed so that a large number of meat bodies can be equipped simultaneously with stick handles.

In the operation described, the mold plate 10 is quickly filled with coherent food material and the bodies presented, as shown best in FIGS. 3 and 4, the plunger 15 serving to close the slot 12 during the filling operation but being moved rapidly aside as the stick is pressed forwardly into the meat body. Downward movement of the ejecting members 20 rapidly remove the meat bodies 18 with the handles 14 affixed thereto, as illustrated best in FIG. 5.

While in the foregoing specification I have set out specific structure and procedure in considerable detail for the purpose of illustrating embodiments of the invention, it will be understood that such details may be varied widely by those skilled in the art without departing from the spirit of my invention.

I claim:

1. In apparatus for molding a soft plastic coherent material with a stick handle, a plate having a mold recessed therein open at its top and bottom and adapted to receive said material, said plate having a slot open at its bottom communicating with said recess at its forward end and open at its rear end, said plate having a recess communicating at an angle with said slot and having a closure plunger slidably mounted in said recess adapted to close said slot, and power operated means for pressing a stick through said open bottom slot and into said material within said recess, said means being effective for moving said plunger to open said slot.

2. The structure of claim 1 in which said means includes a spring normally urging said plunger into slot-closing position, said plunger having at its rear side a cam face which is engaged by said stick to open said slot.

3. The structure of claim 3 including a guide passage adapted to receive a stick therein and in which said slot communicates at its rear end with said passage.

4. The structure of claim 2 in which means are provided for ejecting said molded meat body with said stick from said mold plate.

5. The structure of claim 2 in which said plate is provided with a plurality of mold recesses and aligned slots.

6. The structure of claim 2 in which sticks are supported in a magazine and are fed therefrom by said stick-pressing means.

7. In apparatus for molding a soft plastic coherent material with a stick handle, a plate having a mold recess therein open at its top and at its bottom and adapted to receive said material, a slot within said plate open at its bottom communicating with said recess at its forward end and open at its rear end, and means for pressing said material downwardly and out of said recess through the bottom of said recess, said means including a shoe which is normally spaced above said plate to permit filling of said recess with said material between said shoe and said plate but which is movable downwardly into said recess to press said material therethrough.

* * * * *